United States Patent
Zhang et al.

(10) Patent No.: US 11,866,612 B1
(45) Date of Patent: Jan. 9, 2024

(54) PREPARATION METHOD OF PHOSPHATE-BASED HIGH-TEMPERATURE-RESISTANT ADHESIVE SELF-REINFORCED BY IN-SITU GROWTH AND LOCKING OF FLAKY KYANITE

(71) Applicant: Civil Aviation Uhiversity of China, Tianjin (CN)

(72) Inventors: Haijun Zhang, Tianjin (CN); Mingchao Wang, Tianjin (CN); Qingsong Zhang, Tianjin (CN); Zhenyu Feng, Tianjin (CN); Yu Wu, Tianjin (CN)

(73) Assignee: Civil Aviation University of China, Tianjin (CN)

( * ) Notice: Subject to any disclaimer, the term of this patent is extended or adjusted under 35 U.S.C. 154(b) by 0 days.

(21) Appl. No.: 18/348,359

(22) Filed: Jul. 7, 2023

(30) Foreign Application Priority Data

Jul. 12, 2022 (CN) .......................... 202210816108.2

(51) Int. Cl.
*C09J 1/00* (2006.01)
*C09J 7/35* (2018.01)
(Continued)

(52) U.S. Cl.
CPC .................. *C09J 1/00* (2013.01); *C08K 3/22* (2013.01); *C08K 3/24* (2013.01); *C08K 3/32* (2013.01);
(Continued)

(58) Field of Classification Search
CPC ......... C09J 1/00; C09J 7/35; C09J 7/10; C09J 2400/10; C08K 3/22; C08K 3/24; C08K 3/32; C08K 3/346; C08K 3/36; C08K 3/38; C08K 2003/2227; C08K 2003/321; C08K 2003/329
See application file for complete search history.

(56) References Cited

FOREIGN PATENT DOCUMENTS

CN  101358111 A  *  2/2009
CN  113234397 B  *  5/2022  ................ C09J 1/00

OTHER PUBLICATIONS

CNIPA, Notification of a First Office Action for CN202210816108. 2, dated Jan. 28, 2023.
(Continued)

*Primary Examiner* — Vishal I Patel
(74) *Attorney, Agent, or Firm* — Zhigang Ma

(57) ABSTRACT

A preparation method for a phosphate-based high-temperature-resistant adhesive self-reinforced by in-situ growth and locking of flaky kyanite is provided, including: preparing a modified filler by using bauxite, kaolin, boric acid and boric oxide, and taking a reaction solution of diluted phosphoric acid and aluminum hydroxide powder as latex liquid, and mixing the modified filler, the latex liquid, and silicon powder to prepare the adhesive. After being treated at 700° C., kyanite grows within the adhesive. As the treatment temperature increases, the size and content of the kyanite are further increased, thereby forming a locking and reinforcing structure. After being treated at 1100° C., the bonding strength of the adhesive reaches up to about 50 MPa, and the adhesive illustrates excellent high-temperature-resistant bonding strength.

8 Claims, 11 Drawing Sheets

(51) Int. Cl.
  *C09J 7/10* (2018.01)
  *C08K 3/38* (2006.01)
  *C08K 3/24* (2006.01)
  *C08K 3/32* (2006.01)
  *C08K 3/22* (2006.01)
  *C08K 3/36* (2006.01)
  *C08K 9/02* (2006.01)
  *C08K 3/34* (2006.01)

(52) U.S. Cl.
  CPC ........... *C08K 3/346* (2013.01); *C08K 3/36* (2013.01); *C08K 3/38* (2013.01); *C08K 9/02* (2013.01); *C09J 7/10* (2018.01); *C09J 7/35* (2018.01); *C08K 2003/2227* (2013.01); *C08K 2003/321* (2013.01); *C08K 2003/329* (2013.01); *C09J 2400/10* (2013.01)

(56) References Cited

OTHER PUBLICATIONS

Civil Aviation University of China (Applicant), Reply to Notification of a First Office Action for CN202210816108.2, w/ replacement claims, dated Feb. 7, 2023.
Civil Aviation University of China (Applicant), Supplemental Reply to Notification of a First Office Action for CN202210816108.2, w/ (allowed) replacement claims, dated Mar. 2, 2023.
CNIPA, Notification to grant patent right for invention in CN202210816108.2, dated Apr. 5, 2023.

* cited by examiner

PREPARATION METHOD OF PHOSPHATE-BASED HIGH-TEMPERATURE-RESISTANT ADHESIVE SELF-REINFORCED BY IN-SITU GROWTH AND LOCKING OF FLAKY KYANITE

TECHNICAL FIELD

The disclosure relates to the technical field of adhesive material preparation, particularly to a preparation method for a phosphate-based high-temperature-resistant adhesive self-reinforced by in-situ growth and locking of flaky kyanite.

BACKGROUND

Various advanced adhesives developed from ancient natural pastes greatly facilitate human production and life and the adhesives are regarded as an indispensable auxiliary tool. In the field of the national defense industry, a special high-temperature-resistant adhesive is widely applied to the preparation, connection, installation, sealing, and maintenance of various hot section components due to its high-temperature resistance, high connection efficiency, high specific strength, perfect sealing performance, various application objects, and etc., such as connection and sealing of engine exhaust nozzle, installation and repair of aircraft thermal protection system insulation tiles, connection and sealing of thermal pipelines of nuclear thermal power stations, and installation and fixation of high-temperature sensors. However, the bonding strength of the high-temperature-resistant adhesive is still far lower than welding techniques such as brazing, and the high-temperature-resistant adhesive exhibits high brittleness due to its high ceramicization at a high temperature, resulting in poor thermal shock resistance, a short service life under a reciprocating high-low temperature environment, thereby greatly limiting a further application of the high-temperature-resistant adhesive.

A phosphate-based high-temperature-resistant adhesive has the advantages of excellent high-temperature resistance, room-temperature curing, strong plasticity, low price, stable performance, etc., thereby becoming a primary representation in numerous special high-temperature-resistant adhesives. Furthermore, the phosphate-based high-temperature-resistant adhesive is widely applied to aerospace, nuclear power, and other industrial fields. In general, scholars' studies on the phosphate-based high-temperature-resistant adhesive focus more on composition optimization and rarely involves structural modification. On a basis of composition control, it is difficult to fundamentally change the ceramicization brittleness of the phosphate-based high-temperature-resistant adhesive subjected to high-temperature treatment, so that the thermal shock resistance of the adhesive is still poor, and how to improve a matrix structure of the adhesive for further enhancing a capability of the adhesive matrix to alleviate thermal stress is critical to improving the performance of the high-temperature-resistant adhesive. Currently, directly mixing micro-nano phases (i.e., fibers, whiskers, and carbon nanotubes) in the high-temperature-resistant adhesive has gradually become a conventional structural improvement for promoting the high-temperature resistance and the thermal shock resistance of the adhesive. However, the directly mixed micro-nano phase is difficult to disperse uniformly in the adhesive, which easily causes agglomeration and reduces the bonding strength of the adhesive. At the same time, the micro-nano reinforced phase is relatively expensive, which increases the cost of producing the high-temperature-resistant adhesive. In contrast, an in-situ growth technology of rod or sheet-shaped large grains not only has low cost, but also can achieve highly uniform growth distribution, good structure improvement, and outstanding strengthening and toughening effect. The in-situ growth technology has been widely used in aspects of improving the performance of high-temperature-resistant ceramics and refractories, but it is rarely reported in the technical field of high-temperature-resistant adhesives. Based on the enormous potential of the in-situ growth technology in improving the matrix structure of high-temperature-resistant adhesive, it is of great theoretical significance and application value to grow controllable toughening and strengthening phases in situ within the matrix of the adhesive during the service life of the high-temperature-resistant adhesive to enhance its effectiveness.

SUMMARY

An objective of the disclosure is to provide a preparation method for a phosphate-based high-temperature-resistant adhesive self-reinforced by in-situ growth and locking of flaky kyanite, thereby solving the problems proposed in the related art.

In order to achieve the above objective, the disclosure provides a technical solution as follows: a preparation method for a phosphate-based high-temperature-resistant adhesive self-reinforced by in-situ growth and locking of flaky kyanite, including the following steps:

step 1, mixing bauxite:kaolin:boric acid:boron oxide according to a mass ratio of 3.35-4.85:8-9:1.5-2.25:1-1.5 to obtain a mixture, placing the mixture in a ball milling tank, adding absolute ethyl alcohol into the ball milling tank according to a solid-liquid ratio of 1:0.8-1.2, carrying out ball milling for 6-12 hours at 250-350 revolutions per minute (r/min) by using a ball mill to obtain a ball-milled mixture, taking out the ball-milled mixture for drying and grinding to obtain a modified filler;

step 2, diluting concentrated phosphoric acid with a mass fraction of 85 wt. % to a mass fraction of 40-50 wt. % to obtain diluted phosphoric acid, heating the diluted phosphoric acid to a temperature range of 70-85° C. in a water bath kettle with a cooling reflux device, and then rapidly pouring aluminum hydroxide powder with an aluminum-phosphorus molar ratio of 0.65-0.85 into the diluted phosphoric acid under a mechanical stifling at 500-650 r/min, followed by keeping the temperature range of 70-85° C., stirring for 1-2 hours at 750-850 r/min, and then stirring for 6-8 hours at 300-400 r/min, thereby obtaining a white adhesive slurry;

step 3, adjusting the temperature range of the water bath kettle in the step 2 to 50-65° C., then mixing the modified filler in the step 1 into the white adhesive slurry in the step 2 according to a solid-liquid mass ratio of 1:4 to 1:6, and mixing silicon powder with a mass fraction of 3-7 wt. % of a total mass of the modified filler and the white adhesive slurry into the modified filler and the white adhesive slurry, and then alternately stirring for 8-12 hours with different speeds at a speed range of 300-700 r/min, thereby preparing the phosphate-based high-temperature-resistant adhesive self-reinforced by in-situ growth and locking of flaky kyanite; and step 4, spreading and bonding the phosphate-based high-temperature-resistant adhesive prepared in the step 3 at room temperature, followed by curing at room temperature overnight, and then being directly used in a high-temperature environment. If the high-temperature-resistant adhesive needs to be accelerated for the curing, magnesium oxide powder with a mass fraction of no more than 2 wt. % is added into the high-temperature-resistant adhesive, thereafter standing for two hours for the curing, and then the high-temperature-resistant adhesive is used in the high-temperature environment. Due to a temperature requirement of the in-situ growth of flaky kyanite within the high-temperature-resistant adhesive, an applicable environment temperature range of the high-temperature-resistant adhesive is 700 degrees Celsius (° C.) to 1300° C.

In an embodiment, in the step 1, the bauxite is one of boehmite and gibbsite, a purity of the bauxite is higher than 90%, and the bauxite is a non-standard mineral. When the bauxite is the boehmite, the mass ratio in the step 1 of the bauxite:the kaolin:the boric acid:the boron oxide is 3.35-3.8:8-9:1.5-2.25:1-1.5; or when the bauxite is the gibbsite, the mass ratio in the step 1 of the bauxite:the kaolin:the boric acid:the boron oxide is 4-4.85:8-9:1.5-2.25:1-1.5.

In an embodiment, in the step 1, the kaolin is a non-standard mineral, a stoichiometry of the kaolin is $2SiO_2 \cdot Al_2O_3 \cdot 2H_2O$, and a purity of the kaolin is higher than 90%.

In an embodiment, in the step 1, the boric acid and the boron oxide are analytical reagents, and purities of the boric acid and the boron oxide are higher than 99%.

In an embodiment, in the step 2, the concentrated phosphoric acid is an analytical reagent, and a purity of the concentrated phosphoric acid is higher than 98%; the aluminum hydroxide powder is sieved through a 300-mesh sieve, and a purity of the aluminum hydroxide powder is higher than 95%.

In an embodiment, in the step 2, the mechanical stirring at 500-650 r/min, the stirring for 1-2 hours at 750-850 r/min, and the stirring for 6-8 hours at 300-400 r/min are carried out in the cooling reflux device.

In an embodiment, in the step 3, the alternately stirring for 8-12 hours with different speeds at the speed range of 300-700 r/min includes: stirring for 20 minutes at 600-700 r/min, stirring for 20 minutes at 400-500 r/min, and stirring for 20 minutes at 300-400 r/min.

In an embodiment, in the step 3, the silicon powder is a nanoscale regulator, and a purity of the silicon powder is higher than 99%.

In an embodiment, in the step 4, the high-temperature-resistant adhesive can be cured at room temperature without heating for the curing. However, a method for improving a curing speed is to add an analytical reagent, which selects the magnesium oxide powder, but its mass fraction does not exceed 2 wt. % of the white adhesive slurry, otherwise, the high-temperature-resistant adhesive can be rapidly cured, resulting in greatly reducing operability.

In an embodiment, in the step 4, the applicable environment temperature range of the high-temperature-resistant adhesive is 700° C. to 1300° C., because the high-temperature-resistant adhesive can grow and maintain a self-locking flaky kyanite array structure within the temperature range, and damage resistance of a layer of the high-temperature-resistant adhesive is significantly improved. Meanwhile, the high-temperature-resistant adhesive also has a good bonding strength in a temperature range of room temperature to 700° C.

Compared with the related art, the disclosure has the following beneficial effects:

1. According to the disclosure, after being treated at 700° C., a certain scale of the flaky kyanite has been grown within the high-temperature-resistant adhesive. Furthermore, with an increase of the treated temperature, a size and a content of the kyanite increase, and a locking reinforcing structure is gradually formed. Moreover, after the high-temperature-resistant adhesive is treated at 1100° C., its bonding strength reaches 50 mega Pascal (MPa), illustrating excellent high-temperature-resistant bonding strength.
2. According to the disclosure, under an act of the locking structure formed by the in-situ growth of kyanite, the high-temperature-resistant adhesive exhibits excellent thermal cycling resistance and anti-seismic effects. Furthermore, the strength retention rate of the adhesive after 60 times of thermal cycling (i.e., a temperature increase and decrease rate of 5° C./min) reaches 67% within a temperature range from room temperature to 1100° C. Moreover, the strength retention rate of the adhesive after 30 times of the air cooling thermal shock is still as high as 45%, indicating that the effects of the adhesive prepared in the disclosure are significantly better than those of other reported high-temperature-resistant adhesives.
3. The locking structure generated in situ of the high-temperature-resistant adhesive of the disclosure has a significant anti-crack propagation capability and shows a serrated graded fracture phenomenon when the adhesive is subjected to stress.

BRIEF DESCRIPTION OF DRAWINGS

FIG. 1A illustrates the phosphate-based high-temperature-resistant adhesive self-reinforced by in-situ growth and locking of flaky kyanite after the treatment at 700° C.; FIG. 1B illustrates the phosphate-based high-temperature-resistant adhesive self-reinforced by in-situ growth and locking of flaky kyanite after the treatment at 800° C.; FIG. 1C illustrates the phosphate-based high-temperature-resistant adhesive self-reinforced by in-situ growth and locking of flaky kyanite after the treatment at 1100° C.; and FIG. 1D illustrates the phosphate-based high-temperature-resistant adhesive self-reinforced by in-situ growth and locking of flaky kyanite after the treatment at 1400° C.

DETAILED DESCRIPTION OF EMBODIMENTS

Figure 1A:
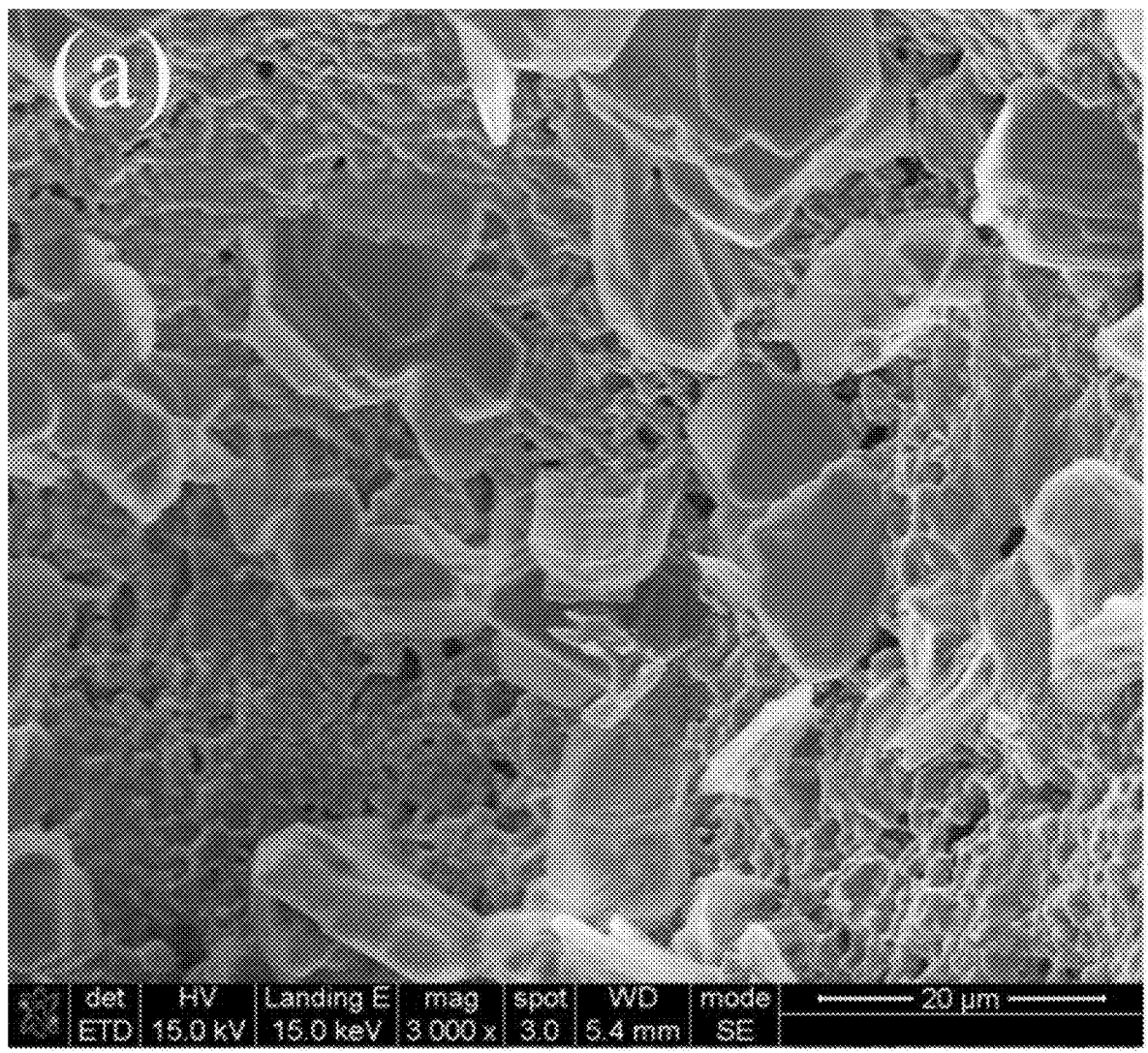
FIGS. 1A-1D illustrate scanning electron microscope diagrams of a surface morphology of a phosphate-based high-temperature-resistant adhesive self-reinforced by in-situ growth and locking of flaky kyanite according to an embodiment 1 of the disclosure after treatment at different temperatures. Specially.
Figure 1B:
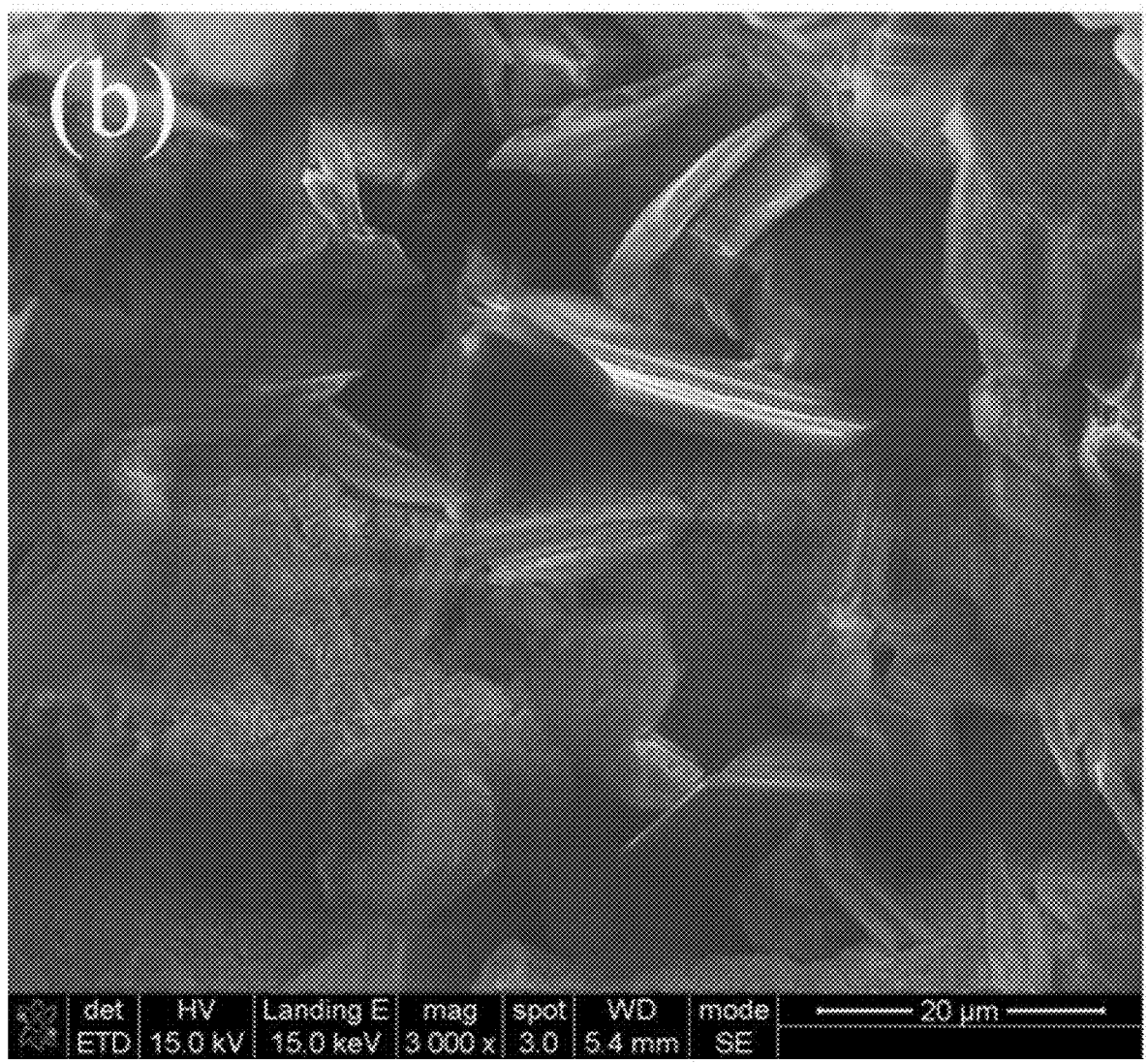
Figure 1C:
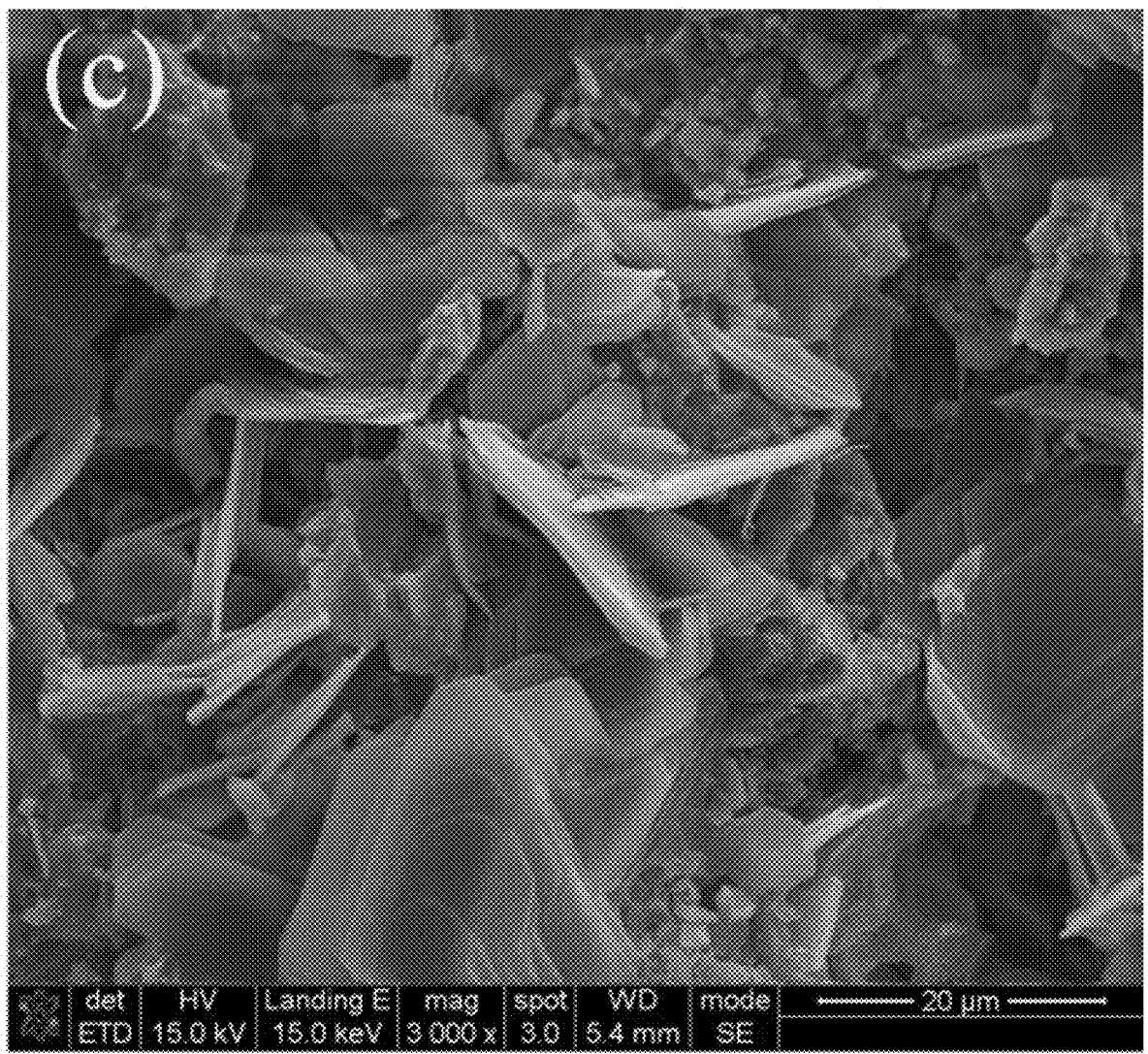
Figure 1D:
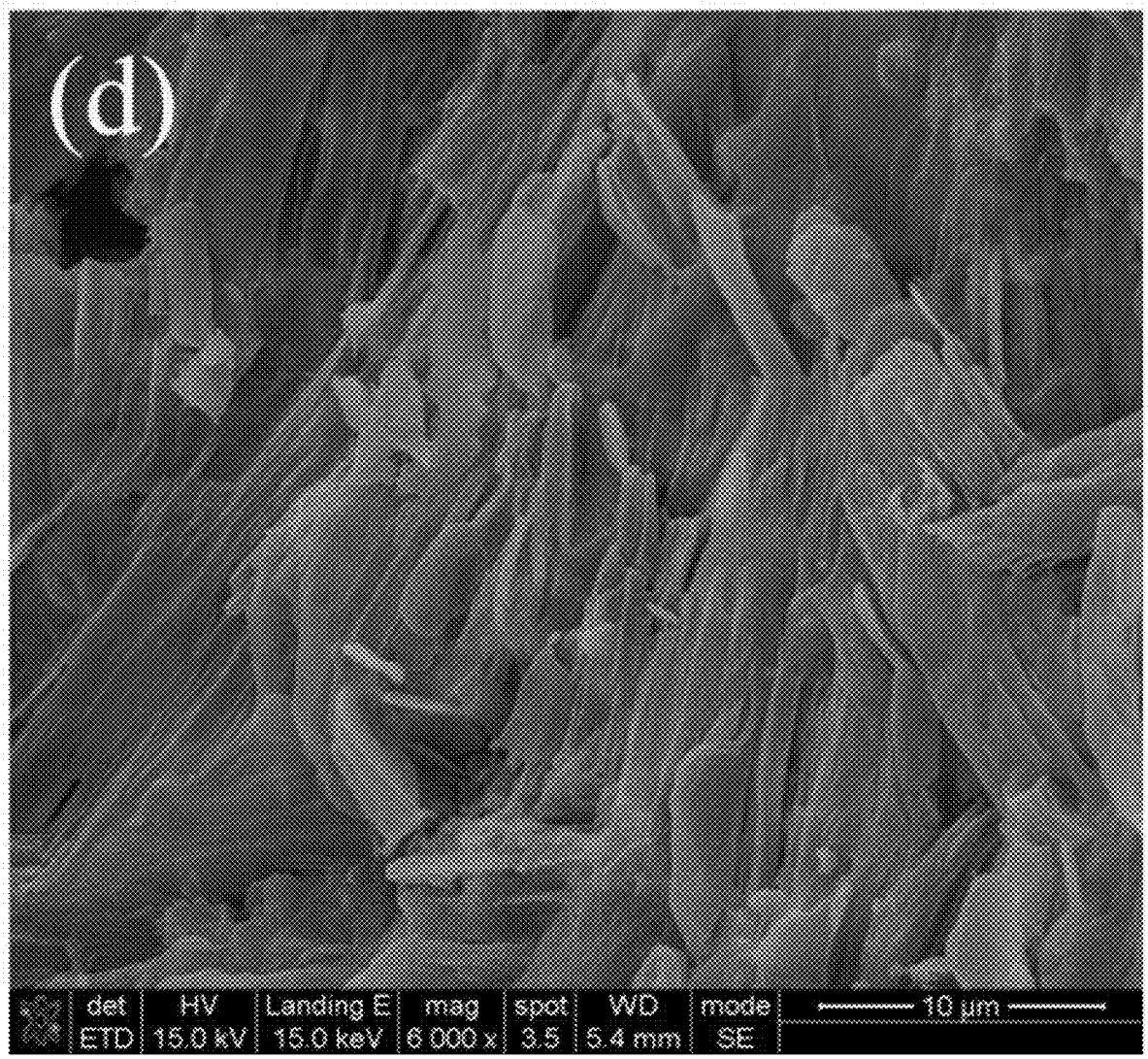

The technical solution in embodiments of the disclosure will be clearly and completely described below with reference to the attached drawings in embodiments of the disclosure. Apparently, the embodiments described in the disclosure are merely some of the disclosure, not all of the embodiments. All of the other embodiments obtained by those skilled in the related art based on the embodiments of the disclosure without creative efforts shall fall within the protection scope of the disclosure.

Embodiment 1

The disclosure provides a technical solution: a preparation method for a phosphate-based high-temperature-resistant adhesive self-reinforced by in-situ growth and locking of flaky kyanite, including the following steps.

Step 1, bauxite:kaolin:boric acid:boron oxide are mixed according to a mass ratio of 3.8:9:2:1 to obtain a mixture, the mixture is placed in a ball milling tank, then absolute ethyl alcohol is added into the ball milling tank according to a solid-liquid ratio of 1:1, ball milling is carried out for 8 hours at 300 revolutions per minute (r/min) by using a conventional ball mill to obtain a ball-milled mixture, the ball-milled mixture is taken out for drying and grinding to obtain a modified filler.

Step 2, concentrated phosphoric acid with a mass fraction of 85 wt. % is diluted to a mass fraction of 50 wt. % to obtain diluted phosphoric acid, the diluted phosphoric acid is heated to 80° C. in a water bath kettle with a cooling reflux device, and then aluminum hydroxide powder with an aluminum-phosphorus molar ratio of 0.7 is rapidly poured into the diluted phosphoric acid solution under a high-speed mechanical stirring at 650 r/min, followed by keeping the temperature at 80° C., stirring for 1 hour at 850 r/min, and then stirring for 7 hours at 400 r/min, thereby obtaining a white adhesive slurry.

Step 3, the temperature of the water bath kettle in the step 2 is adjusted to 60° C., then the modified filler obtained in the step 1 is mixed into the white adhesive slurry obtained in the step 2 according to a solid-liquid mass ratio of 1:5, and meanwhile, silicon powder with a mass fraction of 7 wt. % of a total mass of the modified filler and the white adhesive slurry is mixed into the modified filler and the white adhesive slurry, followed by high-low speed cycling alternative stirring for 10 hours (i.e., stirring for 20 minutes at 700 r/min, stirring for 20 minutes at 500 r/min, and stirring for 20 minutes at 350 r/min), thereby preparing the phosphate-based high-temperature-resistant adhesive self-reinforced by in-situ growth and locking of flaky kyanite.

Step 4, there is no curing agent added in the embodiment 1, and the high-temperature-resistant adhesive prepared in the above step 3 is directly used to bond an adhesive component.

Embodiment 2

The disclosure provides a technical solution: a preparation method for a phosphate-based high-temperature-resistant adhesive self-reinforced by in-situ growth and locking of flaky kyanite, including the following steps.

Step 1, bauxite:kaolin:boric acid:boron oxide are mixed according to a mass ratio of 4.8:8.5:1.5:1.5 to obtain a mixture, the mixture is placed in a ball milling tank, then absolute ethyl alcohol is added into the ball milling tank according to a solid-liquid ratio of 1:1.2, ball milling is carried out for 10 hours at 350 r/min by using a conventional ball mill to obtain a ball-milled mixture, the ball-milled mixture is taken out for drying and grinding to obtain a modified filler.

Step 2, concentrated phosphoric acid with a mass fraction of 85 wt. % is diluted to a mass fraction of 40 wt. % to obtain diluted phosphoric acid, the diluted phosphoric acid is heated to 85° C. in a water bath kettle with a cooling reflux device, and then aluminum hydroxide powder with an aluminum-phosphorus molar ratio of 0.65 is rapidly poured into the diluted phosphoric acid solution under a high-speed mechanical stirring at 500 r/min, followed by keeping the temperature at 85° C., stirring for 2 hours at 750 r/min, and then stirring for 8 hours at 350 r/min, thereby obtaining a white adhesive slurry.

Step 3, the temperature of the water bath kettle in the step 2 is adjusted to 65° C., then the modified filler obtained in the step 1 is mixed into the white adhesive slurry obtained in the step 2 according to a solid-liquid mass ratio of 1:6, and meanwhile, silicon powder with a mass fraction of 5 wt. % of a total mass of the modified filler and the white adhesive slurry is mixed into the modified filler and the white adhesive slurry, followed by high-low speed cycling alternative stirring for 12 hours (i.e., stirring for 20 minutes at 650 r/min, stirring for 20 minutes at 500 r/min, and stirring for 20 minutes at 300 r/min), thereby preparing the phosphate-based high-temperature-resistant adhesive self-reinforced by in-situ growth and locking of flaky kyanite.

Step 4, magnesium oxide powder with a mass fraction of 1.5 wt. % is added into the high-temperature-resistant adhesive prepared in the step 3, followed by stirring evenly, and then bonding an adhesive component.

Embodiment 3

The disclosure provides a technical solution: a preparation method for a phosphate-based high-temperature-resistant adhesive self-reinforced by in-situ growth and locking of flaky kyanite, including following steps.

Step 1, bauxite:kaolin:boric acid:boron oxide are mixed according to a mass ratio of 3.5:8.5:2.25:1 to obtain a mixture, the mixture is placed in a ball milling tank, then absolute ethyl alcohol is added into the ball milling tank according to a solid-liquid ratio of 1:0.8, ball milling is carried out for 12 hours at 250 r/min by using a conventional ball mill to obtain a ball-milled mixture, the ball-milled mixture is taken out for drying and grinding to obtain a modified filler.

Step 2, concentrated phosphoric acid with a mass fraction of 85 wt. % is diluted to a mass fraction of 45 wt. % to obtain diluted phosphoric acid, the diluted phosphoric acid is heated to 70° C. in a water bath kettle with a cooling reflux device, and then aluminum hydroxide powder with an aluminum-phosphorus molar ratio of 0.85 is rapidly poured into the diluted phosphoric acid solution under a high-speed mechanical stirring of 600 r/min, followed by keeping the temperature at 70° C., stirring for 2 hours at 750 r/min, and then stirring for 6 hours at 400 r/min, thereby obtaining a white adhesive slurry.

Step 3, the temperature of the water bath kettle in the step 2 is adjusted to 50° C., then the modified filler obtained in the step 1 is mixed into the white adhesive slurry obtained in the step 2 according to a solid-liquid mass ratio of 1:4, and meanwhile, silicon powder with a mass fraction of 3 wt. % of a total mass of the modified filler and the white adhesive slurry is mixed into the modified filler and the white adhesive slurry, followed by high-low speed cycling alternative stirring for 8 hours (i.e., stirring for 20 minutes at 700 r/min, stirring for 20 minutes at 450 r/min, and stirring for 20 minutes at 350 r/min), thereby preparing the phosphate-based high-temperature-resistant adhesive self-reinforced by in-situ growth and locking of flaky kyanite.

Step 4, magnesium oxide powder with a mass fraction of 2 wt. % is added into the high-temperature-resistant adhesive prepared in the step 3, followed by stirring evenly and then bonding an adhesive component.

In the phosphate-based high-temperature-resistant adhesive self-reinforced by in-situ growth and locking of flaky kyanite obtained by the preparation method for the disclosure, a main bonding phase is macromolecular aluminum phosphate white emulsion prepared by a reaction of the diluted phosphoric acid with the aluminum hydroxide; the bauxite and the kaolin are main aluminum and silicon sources for a formation of the flaky kyanite under the high temperature; the boron oxide melts at the high temperature to generate a liquid phase, which provides a favorable liquid environment for promoting the formation of the flaky kyanite; and on the one hand, the boric acid dehydrates to generate boron oxide, and on the other hand, a porosity of adhesive matrix is increased during the dehydration to provide a growth space for the flaky kyanite; and meanwhile, pores generated during the decomposition of the adhesive matrix can also provide growth space for the flaky kyanite. In addition, on the one hand, the silicon powder is used as a viscosity regulator to improve the viscosity of the adhesive slurry, and on the other hand, the silicon powder is oxidized at a high temperature to generate silicon dioxide to improve the compactness of the locking structure. In addition, the generated silicon dioxide can also be used to stabilize the boron oxide and prevent the boron oxide from excessive volatilization.

In order to verify the bonding performance, anti-seismic effect, and thermal cycling resistance effect of the high-temperature-resistant adhesive provided by the above embodiments, the disclosure performs the following verification experiments on the high-temperature-resistant adhesive prepared in the embodiment 1. The experimental steps are as follows.

A plurality of mullite plates (40 millimeter abbreviated as mmx 10 mmx 5 mm) treated by polishing, washing, and drying are placed flat on a flawless glass plate, and bonding surfaces of which are placed upward.

The high-temperature-resistant adhesive, which is prepared in the embodiment 1 under the condition of no addition of the magnesium oxide powder, is applied to bonding surfaces of the plurality of mullite plates by using a scraper, a bonding area is 20 mmx 10 mm, and then a thickness of the high-temperature-resistant adhesive on each bonding surface is controlled to be 200 micrometers (μm) by using a coater.

The bonding surfaces of two of the plurality of mullite plates are bonded together by slight hand pressing for 10 seconds, thereafter curing at room temperature. In order to ensure structural stability in the curing process, heavy pressure is applied to the center of the adhesive component, and performs the curing overnight.

The cured adhesive component is placed in a muffle furnace for calcination at temperatures of 100° C., 200° C., 300° C., 400° C., 500° C., 600° C., 700° C., 800° C., 900° C., 1000° C., 1100° C., 1200° C., 1300° C., 1400° C., and 1500° C., and is calcined for 1 hour at each temperature.

Observation of a microscopic morphology of the high-temperature-resistant adhesive: a cross-section of the adhesive component treated at different temperatures is ground and polished, and is etched by a weak acid for a moment, and then is washed and dried, followed by observing the microscopic morphology of the bonding surface at 700° C., 800° C., 1100° C., and 1400° C. under a scanning electron microscope (SEM), as shown in FIGS. 1A-1D and FIG. 2.

It can be seen from FIGS. 1A-1D that after being treated at 700° C., a small amount of circular flaky kyanite has been generated in the adhesive, with a size of 10 μm to 20 μm. After being treated at 900° C., the size of the flaky kyanite is significantly increased, and the flaky kyanite is multi-layered observed from a thickness direction. After being treated at 1100° C., the number of kyanite is also increased, and at this time, an obvious locking structure appears in the adhesive. And after being treated at 1400° C., an interlayer space between the kyanite becomes more compact, resulting from the oxidation of the silicon powder.

Figure 2:
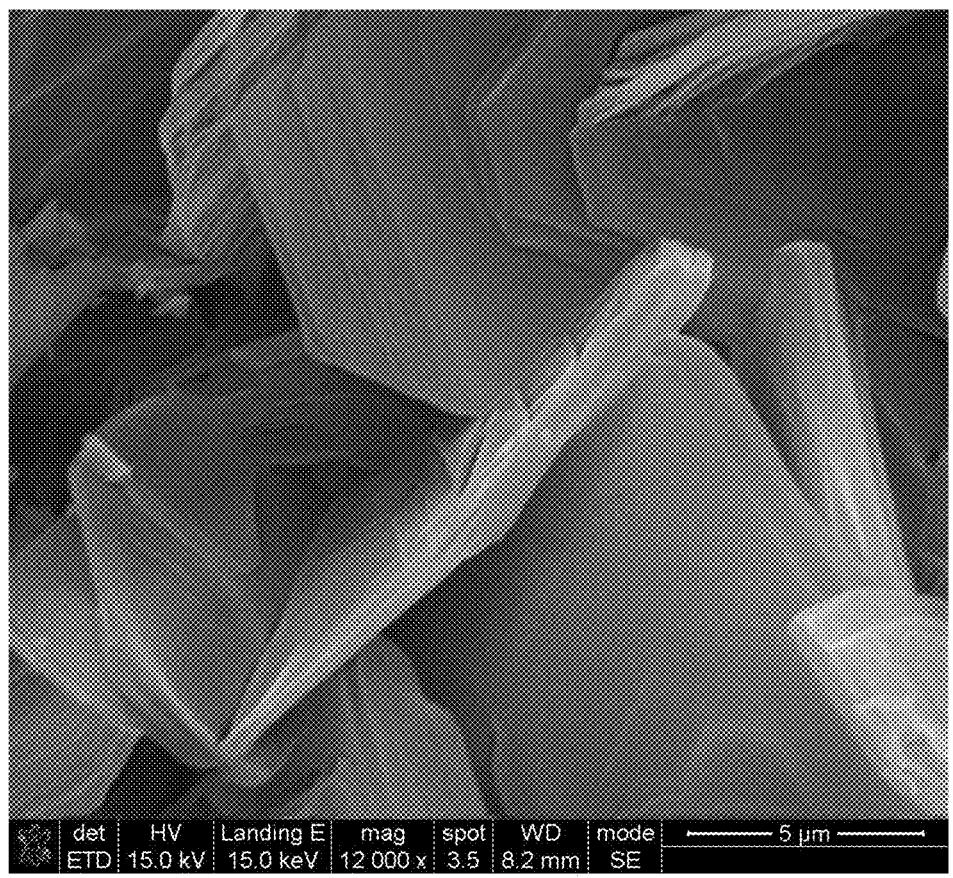
FIG. 2 illustrates a scanning electron microscope diagram of an enlarged morphology of a locking structure formed by in-situ growth of kyanite within the high-temperature-resistant adhesive according to the embodiment 1 of the disclosure after the treatment at 1100° C.

FIG. 2 illustrates the SEM morphology of the locking structure formed by the in-situ growth of kyanite after being treated at 1100° C. The interlayer space between the kyanite is clamped and can bear greater impact while increasing weak interfaces.

Figure 3:
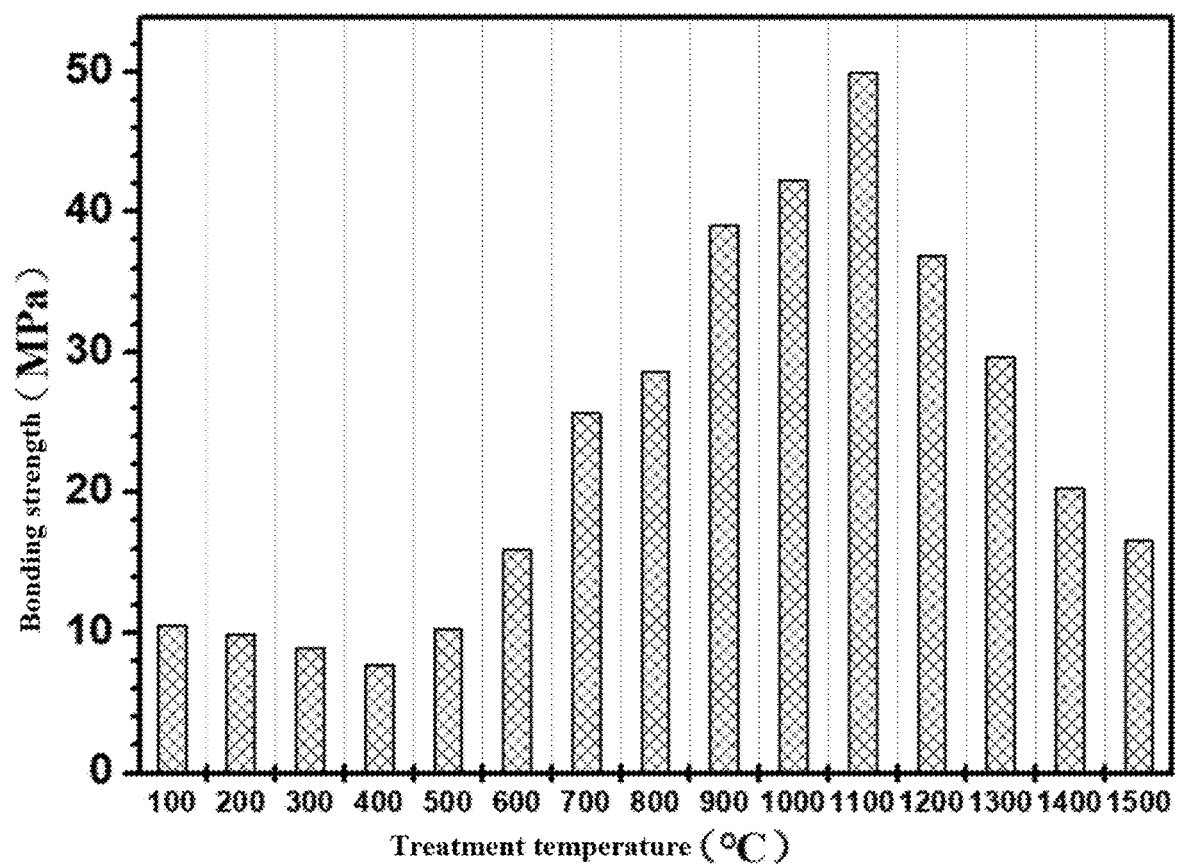
FIG. 3 illustrates a comparison diagram of shear strength of a mullite ceramic adhesive component bonded by the high-temperature-resistant adhesive according to the embodiment 1 of the disclosure after the treatment at different temperatures.

The bonding performance of the high-temperature-resistant adhesive test: the adhesive component treated at different temperatures is placed under an electronic universal testing machine, and a maximum apparent shear force of the adhesive component is measured at a pressurization rate of 0.5 millimeters per minute (mm/min), and the bonding strength of a unit bonding surface is calculated, as shown in FIG. 3. At the same time, the loading force-displacement curve of the adhesive component at 1100° C. is recorded, as shown in FIG. 4.

As shown in FIG. 3, the bonding strength of the high-temperature-resistant adhesive in the temperature range of 600° C. to 1100° C. increases quickly, and a maximum value is up to about 50 mega Pascal (MPa) when the high-temperature-resistant adhesive is treated at 1100° C. And then, in a temperature range of 1100° C. to 1500° C., as the processing temperature increases, the bonding strength decreases, which results from two aspects as follows. 1. A higher temperature causes the kyanite to further react, thereby destroying the original locking structure. 2. The increase of the density of the high-temperature-resistant adhesive reduces the proportion of the weak interfaces therein. In summary, an illustrated applicable temperature range of the high-temperature-resistant adhesive is 700° C. to 1300° C.

Figure 4:
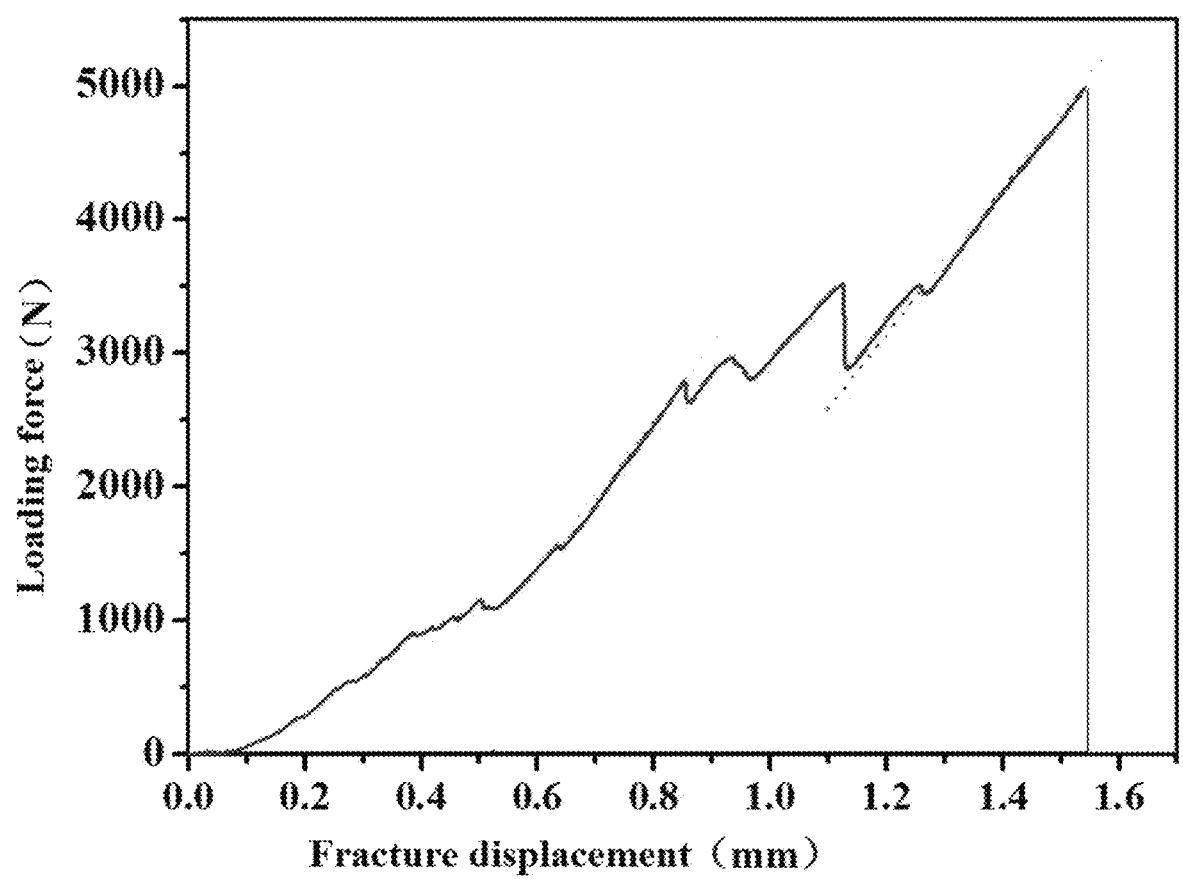
FIG. 4 illustrates a loading force-displacement curve of the mullite ceramic adhesive component bonded by the high-temperature-resistant adhesive according to the embodiment 1 of the disclosure after the treatment at 1100° C. and then subjected to a shear test.

As shown in FIG. 4, after the high-temperature-resistant adhesive forms the in-situ growth and locking of flaky kyanite treated at 1100° C., an obvious toothed fracture structure appears on the loading force-displacement curve, which results from a crack propagation prevention during that the locking structure bears force, indicating that the high-temperature-resistant adhesive has excellent anti-crack propagation capability.

Figure 5:
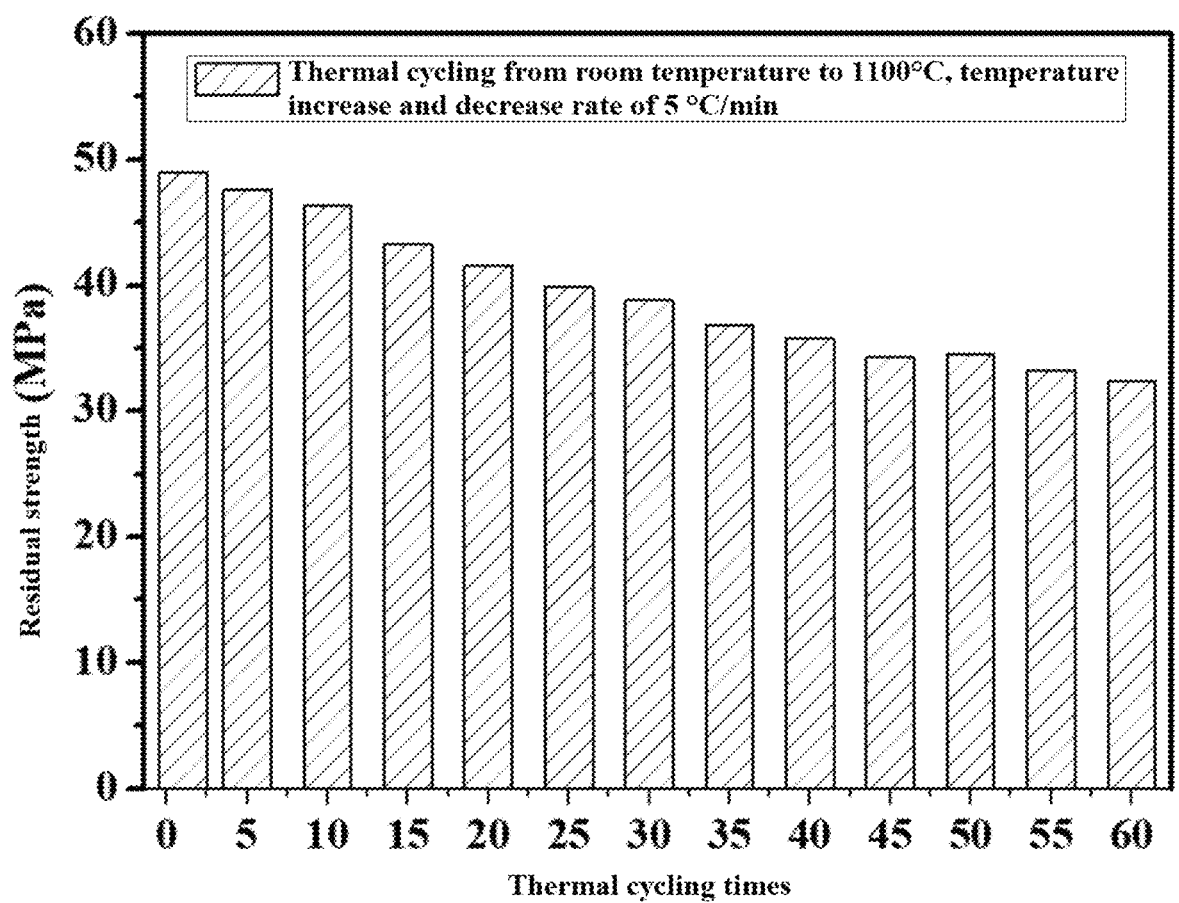
FIG. 5 illustrates a residual strength of the high-temperature-resistant adhesive according to the embodiment 1 of the disclosure after different times of thermal cycling under a temperature range from room temperature to 1100° C.

The thermal cycling resistance test of the high-temperature-resistant adhesive: the muffle furnace is used to perform cooling-heating circulation at the temperature range of room temperature to 1100° C., a temperature increase rate and a temperature decrease rate are both controlled at 5° C./min and then the bonding strength of the high-temperature-resistant adhesive after different cycling times is tested by using the electronic universal testing machine, as shown in FIG. 5.

As shown in FIG. 5, as the thermal cycling times increase, the bonding strength of the high-temperature-resistant adhesive is gradually reduced, and a strength retention rate after 60 times of thermal cycling is as high as 67%, which is sufficient to indicate that the high-temperature-resistant adhesive modified by the locking structure has a better thermal cycling resistance.

The thermal shock resistance test of the high-temperature-resistant adhesive: an air cooling thermal shock test is conducted by using a thermal shock furnace within the temperature range of room temperature to 1100° C. The adhesive component treated at 1100° C. is directly placed in the furnace chamber at 1100° C. for 10 minutes, followed by directly taking out the furnace chamber for air cooling. And then, the bonding strength of the high-temperature-resistant adhesive after different thermal shock times is tested by using the electronic universal testing machine, as shown in FIG. 6.

Figure 6:
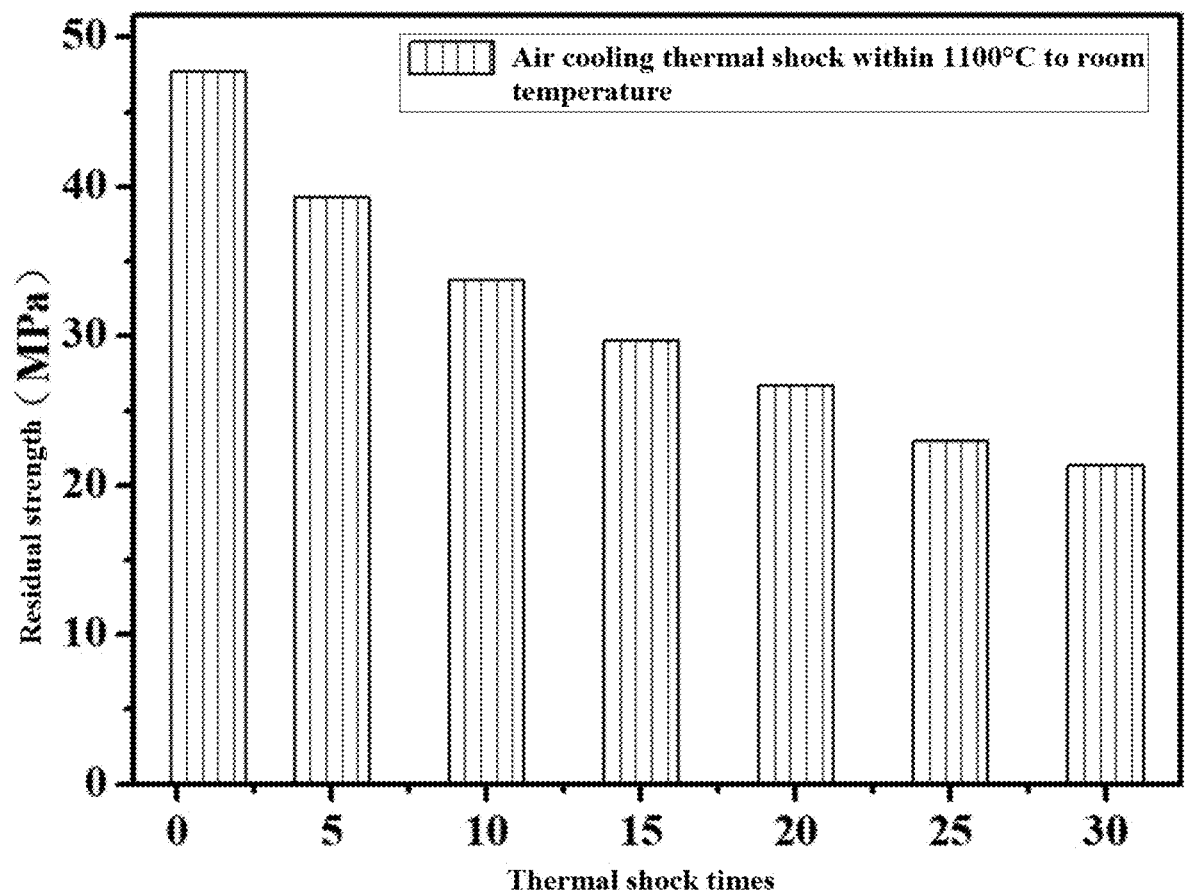
FIG. 6 illustrates a residual strength of the high-temperature-resistant adhesive according to the embodiment 1 of the disclosure after different times of thermal shock under the temperature range from room temperature to 1100° C.

As shown in FIG. 6, as the thermal shock times increase, the residual strength of the high-temperature-resistant adhesive decreases significantly, but the strength decay rate is significantly lower than the reported high-temperature-resistant adhesives in the related art. The bonding strength retention rate after 30 times of the air cooling thermal shock can still reach 45%, which again indicates that the locking structure can obviously improve the thermal shock resistance of the high-temperature-resistant adhesive.

Figure 7A:
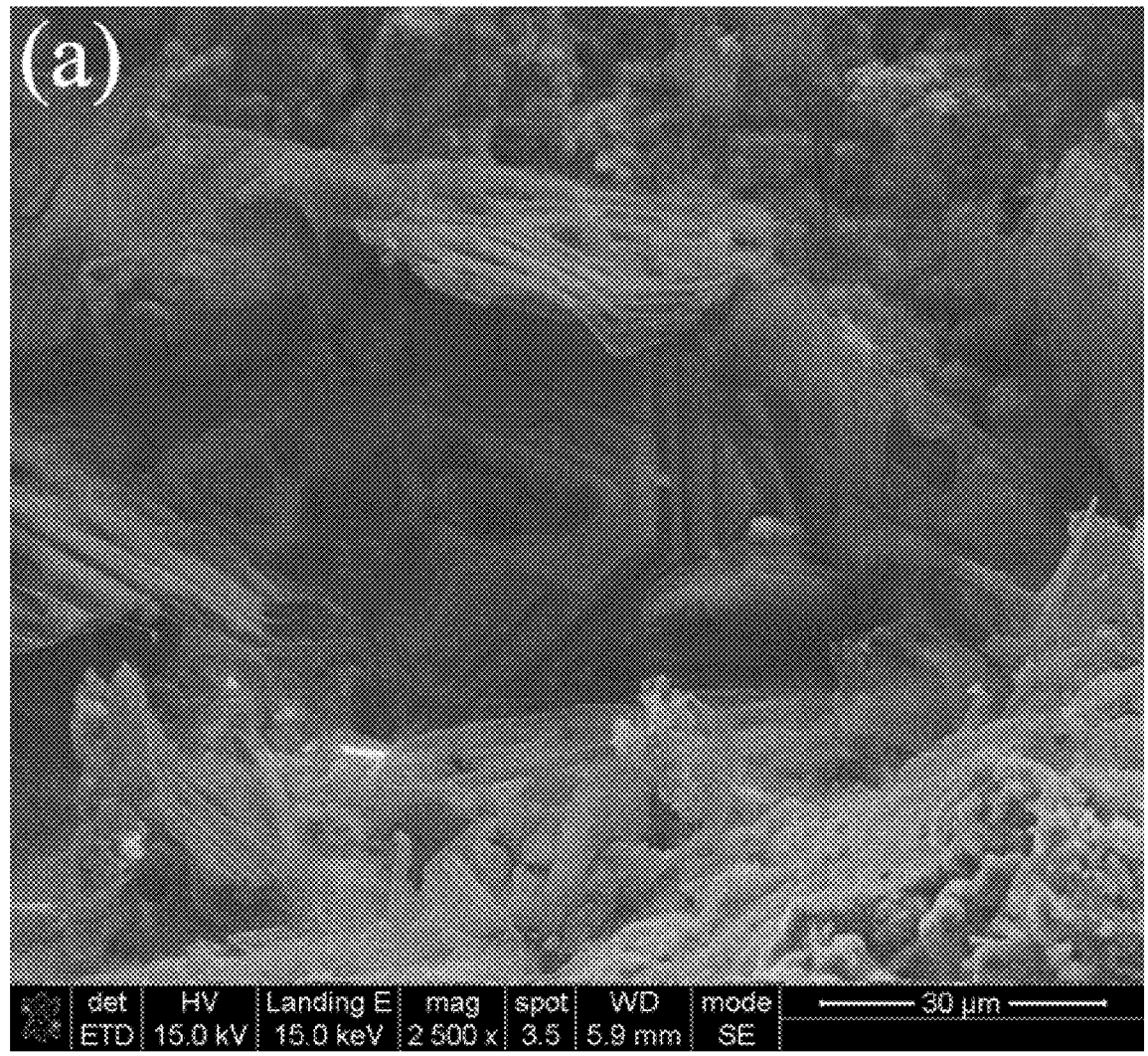
FIGS. 7A-7B illustrate morphology diagrams of a fracture surface after that the mullite ceramic adhesive component bonded by the high-temperature-resistant adhesive according to the embodiment 1 of the disclosure after the treatment at 1100° C. is subjected to the shear test.
Figure 7B:
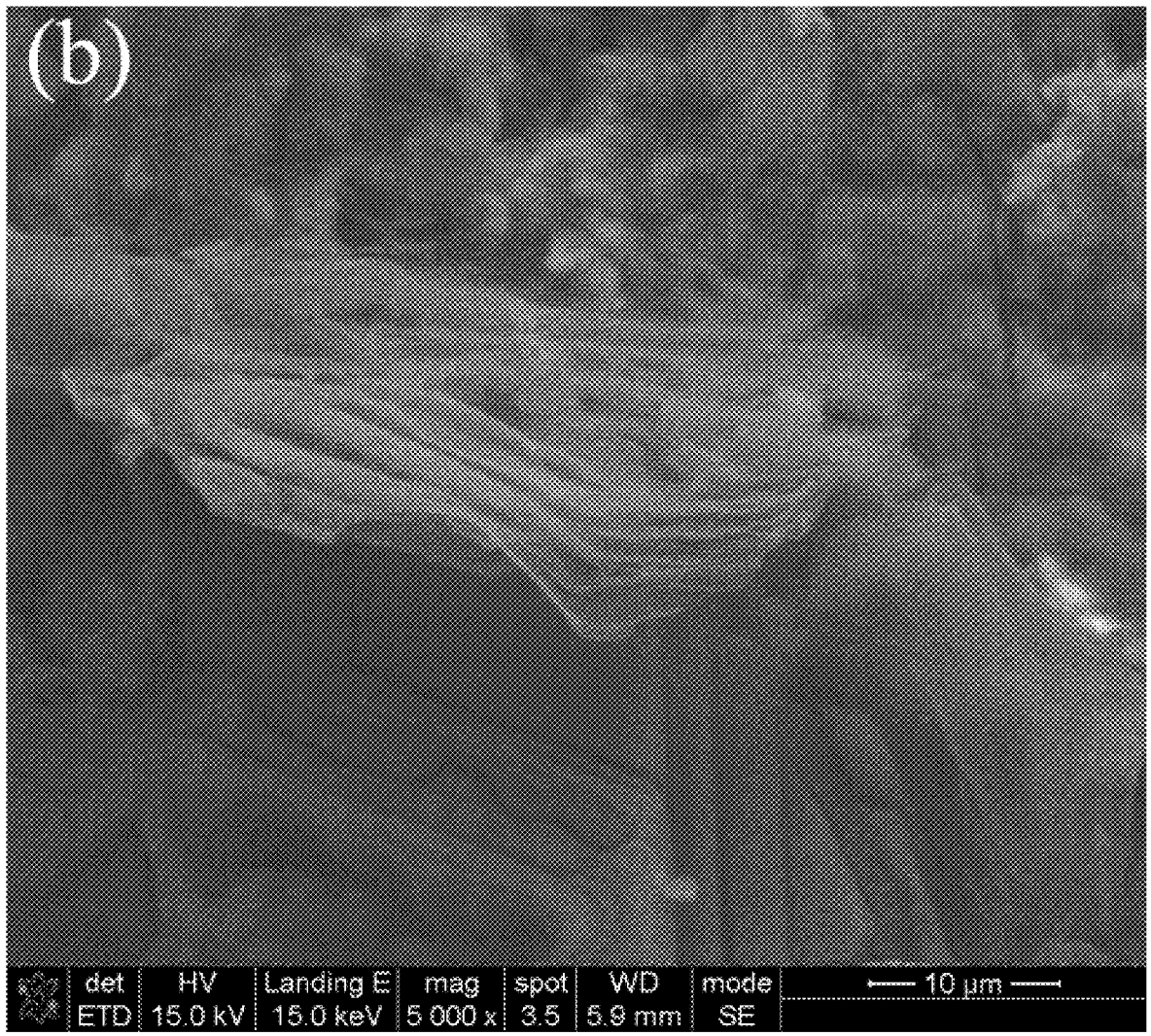

Observation of the fracture surface of the high-temperature-resistant adhesive: the fracture surface of the adhesive component subjected to the shear test and treated at 1100° C. is placed under the SEM for fracture surface observation, as shown in FIGS. 7A-7B.

As shown in FIGS. 7A-7B, after the shear test, the locking structure of the kyanite has been significantly damaged, and parts of the flaky kyanite can observe obvious cracks, while the original clamped space is directly cracked.

It should be noted that, in the disclosure, relational terms, such as first and second, are merely used to distinguish an entity or an operation from another entity or operation, without necessarily requiring or implying any such actual relationship or order between these entities or operations. Moreover, terms "including", "comprising", or any other variant thereof are intended to cover a non-exclusive inclusion, such that a process, a method, a manufacture, or a device that includes a series of elements includes not only those described elements, but also other elements not expressly listed, or elements inherent to the process, the method, the manufacture, or the device.

Although the embodiments of the disclosure have been illustrated and described, it will be understood by those skilled in the related art that various changes, modifications, substitutions, and variations can be made to these embodiments without departing from the principles and spirit of the disclosure, which is defined by the disclosure and its equivalents.

What is claimed is:

1. A preparation method for a phosphate-based high-temperature-resistant adhesive self-reinforced by in-situ growth and locking of flaky kyanite applied in a temperature range of 700 degrees Celsius (° C.) to 1300° C., comprising following steps:
   step 1, mixing bauxite:kaolin:boric acid:boron oxide according to a mass ratio of 3.35-4.85:8-9:1.5-2.25:1-1.5 to obtain a mixture, placing the mixture in a ball milling tank, adding absolute ethyl alcohol into the ball milling tank according to a solid-liquid ratio of 1:0.8-1.2, carrying out ball milling for 6-12 hours at 250-350 revolutions per minute (r/min) by using a ball mill to obtain a ball-milled mixture, taking out the ball-milled mixture for drying and grinding to obtain a modified filler;
   step 2, diluting concentrated phosphoric acid with a mass fraction of 85 wt. % to a mass fraction of 40-50 wt. % to obtain diluted phosphoric acid, heating the diluted phosphoric acid to a temperature range of 70-85° C. in a water bath kettle with a cooling reflux device, and then rapidly pouring aluminum hydroxide powder with an aluminum-phosphorus molar ratio of 0.65-0.85 into the diluted phosphoric acid under a mechanical stirring at 500-650 r/min, followed by keeping the temperature range of 70-85° C., stirring for 1-2 hours at 750-850 r/min, and then stirring for 6-8 hours at 300-400 r/min, thereby obtaining a white adhesive slurry; and
   step 3, adjusting the temperature range of the water bath kettle in the step 2 to 50-65° C., then mixing the modified filler in the step 1 into the white adhesive slurry in the step 2 according to a solid-liquid mass ratio of 1:4 to 1:6, and mixing silicon powder with a mass fraction of 3-7 wt. % of a total mass of the modified filler and the white adhesive slurry into the modified filler and the white adhesive slurry, and then alternately stirring for 8-12 hours with different speeds at a speed range of 300-700 r/min, thereby preparing the phosphate-based high-temperature-resistant adhesive self-reinforced by in-situ growth and locking of flaky kyanite.

2. The preparation method for the phosphate-based high-temperature-resistant adhesive self-reinforced by in-situ growth and locking of flaky kyanite applied in the temperature range of 700° C. to 1300° C. as claimed in claim 1, wherein in the step 1, the bauxite is one of boehmite and gibbsite, a purity of the bauxite is higher than 90%, and the bauxite is a non-standard mineral;
   when the bauxite is the boehmite, the mass ratio in the step 1 of the bauxite:the kaolin:the boric acid:the boron oxide is 3.35-3.8:8-9:1.5-2.25:1-1.5; or when the bauxite is the gibbsite, the mass ratio in the step 1 of the bauxite:the kaolin:the boric acid:the boron oxide is 4-4.85:8-9:1.5-2.25:1-1.5.

3. The preparation method for the phosphate-based high-temperature-resistant adhesive self-reinforced by in-situ growth and locking of flaky kyanite applied in the temperature range of 700° C. to 1300° C. as claimed in claim 1, wherein in the step 1, the kaolin is a non-standard mineral, a stoichiometry of the kaolin is $2SiO_2 \cdot Al_2O_3 \cdot 2H_2O$, and a purity of the kaolin is higher than 90%.

4. The preparation method for the phosphate-based high-temperature-resistant adhesive self-reinforced by in-situ growth and locking of flaky kyanite applied in the temperature range of 700° C. to 1300° C. as claimed in claim 1, wherein in the step 1, the boric acid and the boron oxide are analytical reagents, and purities of the boric acid and the boron oxide are higher than 99%.

5. The preparation method for the phosphate-based high-temperature-resistant adhesive self-reinforced by in-situ growth and locking of flaky kyanite applied in the temperature range of 700° C. to 1300° C. as claimed in claim 1, wherein in the step 2, the concentrated phosphoric acid is an analytical reagent, and a purity of the concentrated phosphoric acid is higher than 98%; the aluminum hydroxide powder is sieved through a 300-mesh sieve, and a purity of the aluminum hydroxide powder is higher than 95%.

6. The preparation method for the phosphate-based high-temperature-resistant adhesive self-reinforced by in-situ growth and locking of flaky kyanite applied in the temperature range of 700° C. to 1300° C. as claimed in claim 1, wherein in the step 2, the mechanical stirring at 500-650 r/min, the stirring for 1-2 hours at 750-850 r/min, and the stirring for 6-8 hours at 300-400 r/min are carried out in the cooling reflux device.

7. The preparation method for the phosphate-based high-temperature-resistant adhesive self-reinforced by in-situ growth and locking of flaky kyanite applied in the temperature range of 700° C. to 1300° C. as claimed in claim 1, wherein in the step 3, the alternately stirring for 8-12 hours with different speeds at the speed range of 300-700 r/min, comprises: stirring for 20 minutes at 600-700 r/min, stirring for 20 minutes at 400-500 r/min, and stirring for 20 minutes at 300-400 r/min.

8. The preparation method for the phosphate-based high-temperature-resistant adhesive self-reinforced by in-situ growth and locking of flaky kyanite applied in the temperature range of 700° C. to 1300° C. as claimed in claim 1, wherein in the step 3, the silicon powder is a nanoscale regulator, and a purity of the silicon powder is higher than 99%.

* * * * *